United States Patent [19]

Kraus

[11] 4,434,675

[45] Mar. 6, 1984

[54] TRANSMISSION RATIO CONTROL ARRANGEMENT FOR A PRECESS CAM CONTROLLED INFINITELY VARIABLE TRACTION ROLLER TRANSMISSION

[75] Inventor: Charles E. Kraus, Austin, Tex.

[73] Assignee: Excelermatic Inc., Austin, Tex.

[21] Appl. No.: 301,442

[22] Filed: Sep. 11, 1981

[51] Int. Cl.³ .............................................. F16H 15/08
[52] U.S. Cl. ...................................... 74/200; 74/199; 74/201
[58] Field of Search .................. 74/199, 200, 201, 207

[56] References Cited

U.S. PATENT DOCUMENTS

| | | | |
|---|---|---|---|
| 3,048,047 | 8/1962 | Richardson | 74/200 |
| 3,810,398 | 5/1974 | Kraus | 74/200 |
| 3,828,618 | 8/1974 | Sharpe et al. | 74/200 |
| 4,056,989 | 11/1977 | Shaffer | 74/200 |
| 4,086,820 | 5/1978 | Kraus et al. | 74/200 |
| 4,126,052 | 11/1978 | Jackman | 74/200 |
| 4,275,610 | 6/1981 | Kraus | 74/200 |

FOREIGN PATENT DOCUMENTS

| | | | |
|---|---|---|---|
| 1197714 | 7/1965 | Fed. Rep. of Germany | 74/200 |
| 2033507 | 5/1980 | United Kingdom | 74/201 |
| 2035481 | 6/1980 | United Kingdom | 74/201 |

*Primary Examiner*—Lawrence J. Staab
*Assistant Examiner*—Joseph M. Rolnicki
*Attorney, Agent, or Firm*—Klaus J. Bach

[57] ABSTRACT

A transmission ratio control arrangement for a precess cam controlled infinitely variable traction roller transmission in which motion transmitting traction rollers are arranged between, and in frictional engagement with, toric discs mounted on input and output shafts, the traction rollers are supported on pivotal support structures which are axially movable for changing the transmission ratio by hydraulic operating structures disposed adjacent the traction roller support structures which have cam faces associated for movement therewith and cam followers disposed adjacent said cam faces and associated with servo valves for admitting pressurized fluid to and releasing it from, said hydraulic operating structures for adjustment of the transmission ratio.

7 Claims, 3 Drawing Figures

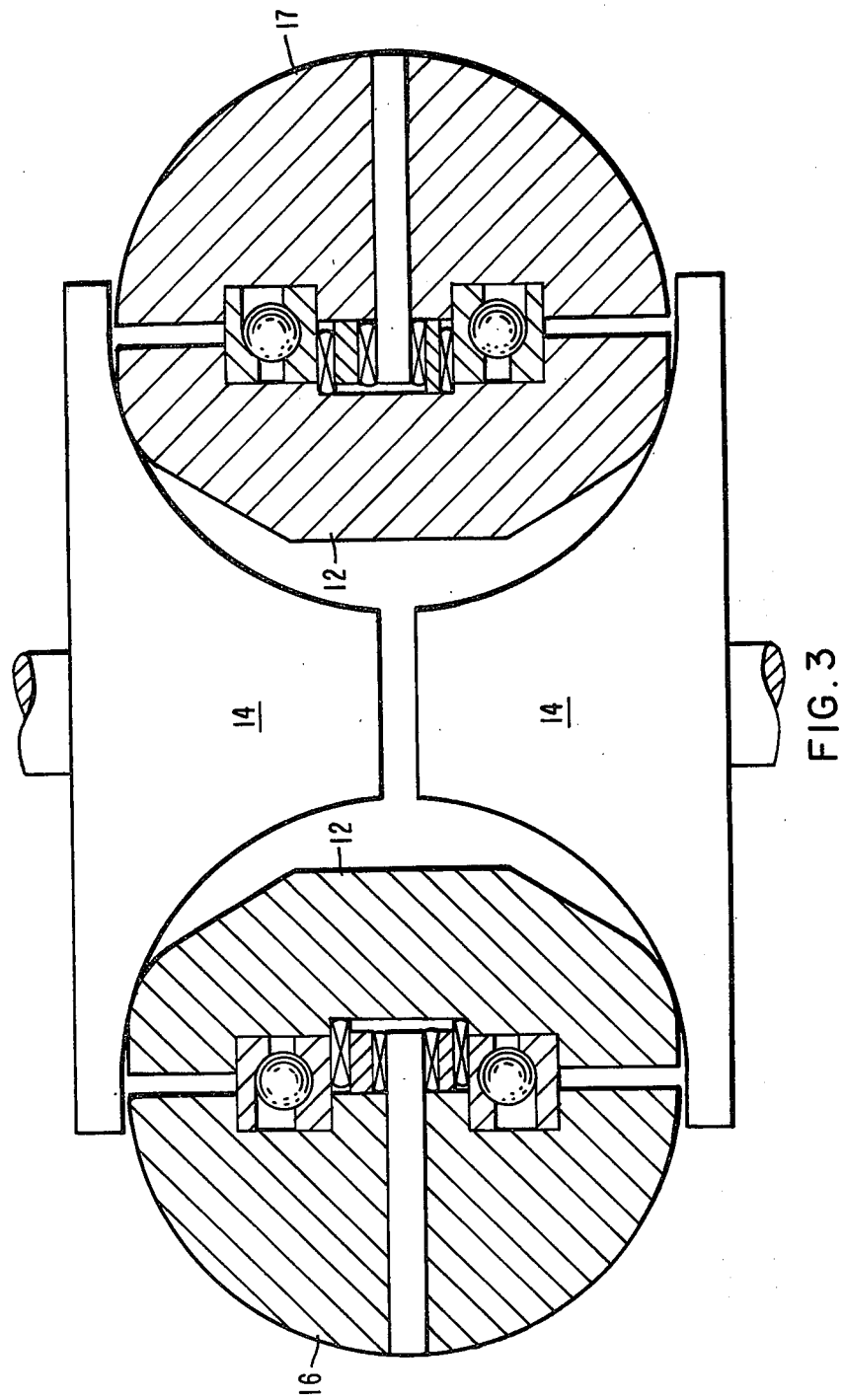

TRANSMISSION RATIO CONTROL ARRANGEMENT FOR A PRECESS CAM CONTROLLED INFINITELY VARIABLE TRACTION ROLLER TRANSMISSION

BACKGROUND OF THE INVENTION

1. Field of the Invention:

The invention relates to an infinitely variable traction roller transmission having motion transmitting traction rollers disposed between, and in engagement with, opposite toric discs mounted on input and output shafts.

2. Description of the Prior Art:

Ratio control of such a transmission is obtained by applying to the traction rollers forces which provide a precess movement that causes pivoting of the support structure of the traction rollers in order to provide for different circles of engagement of the traction rollers with the toric input and output discs with which they are engaged. Such transmissions are described in detail in this applicants U.S. Pat. Nos. 4,275,610; 4,086,820; and 3,810,398 and earlier application Ser. No. 168,521.

Control of high power infinitely variable traction roller transmissions has always been problematic because freedom must be provided for the traction rollers to permit precess movement thereof to initiate a change of the transmission ratio and because there are, during operation of the transmission, reaction forces applied to the traction rollers, which forces are in the precess movement direction of the traction rollers. Earlier designs are provided with cam structures to which the precess forces are applied, for example by a hydraulic piston, and which provide for a predetermined position of such piston for each transmission ratio.

The precess forces however are quite large because, at the same time, the transmission reaction forces must be accommodated and the cams and cam rollers are therefore subject to wear and, in any case, need to be of great strength. The resulting designs are therefore quite expensive.

SUMMARY OF THE INVENTION

In a traction roller transmission with motion transmitting traction rollers arranged between, and in frictional engagement with, toric discs, the traction rollers are mounted on pivot structures which are axially movable to permit initiation of a change of the transmission ratio. Precess forces are applied to the traction roller support structures by hydraulic piston and cylinder arrangements directly associated with the support structures. The traction roller support structures have trunnions carrying cam structures with cam followers which have servo valves associated therewith to control the admission of pressurized hydraulic fluid to the piston and cylinder arrangements.

In this manner only the control forces for controlling the servo valves are transmitted through the cam structure whereas the precess forces are applied directly to the support structures. Therefore, no expensive cam and roller structures are needed but the result is equal. In fact, roller dancing, which has occurred in transmissions which had the precess forces applied to the roller support through the cam and roller arrangements, is eliminated and the costs are also much lower.

BRIEF DESCRIPTION OF THE DRAWINGS

FIG. 3 is a view perpendicular to the view of FIG. 1 and containing the input and output shafts.

DESCRIPTION OF THE PREFERRED EMBODIMENT

For a description of details of a traction roller transmission of the type with which the present invention is concerned and for a description of its basic operation reference is made to the references cited earlier, particularly U.S. Pat. No. 4,086,820.

Figure 1:
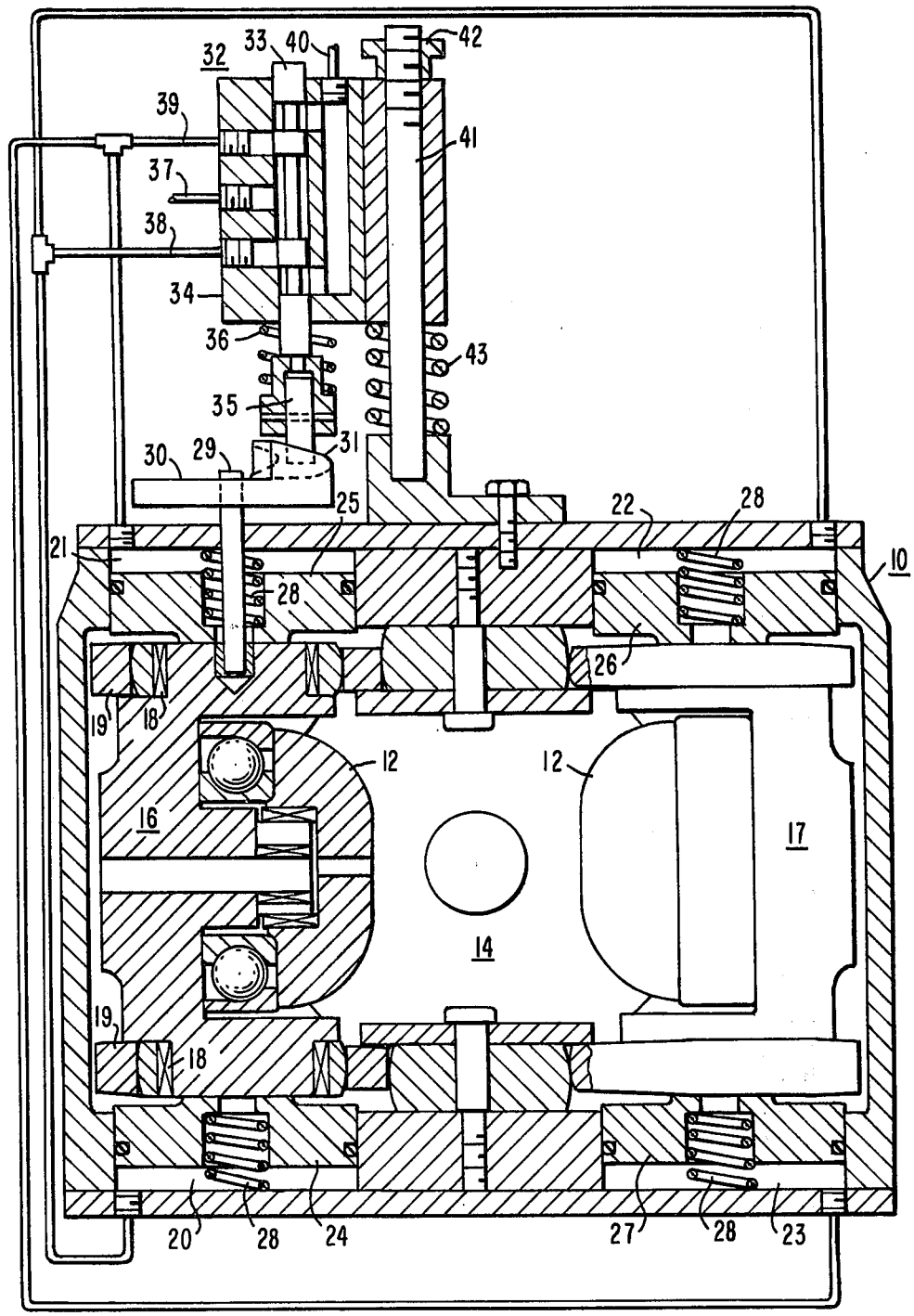
FIG. 1 shows a control arrangement associated with a transmission which is shown in cross-section.

As shown in FIG. 1 such a transmission consists essentially of a housing 10 in which traction rollers 12 are disposed between, and in engagement with, coaxial toroidal discs 14 which are rotatably supported opposite one another on input and output shafts 13, 13' (FIG. 3) and which are forced into firm engagement with the traction rollers 12 with a force depending on the torque transmitted through the transmission. The traction rollers 12 are supported by roller support structures 16, 17 which are pivotally supported by means of bearings 18 on tension sheets 19 which balance radial forces between the opposite support structures 16 and 17 and permit axial movement of the support structures 16, 17 to initiate a change of the transmission ratio.

Axially adjacent the support structures 16 and 17, the housing 10 is provided with cylinders 20, 21, 22 and 23 receiving control pistons 24, 25, 26 and 27 which are biased by springs 28 to abut the roller support structures 16 and 17 or are connected thereto. One of the roller support structures, as shown in FIG. 1 roller support structure 16 has a rod 29 mounted thereon, which rod 29 extends through the piston 25 and through the housing 10 and carries a precess cam 30 provided with a transmission ratio precess cam surface 31. Mounted on the housing 10 adjacent the precess cam 30 is a master control valve 32 which is a normal 4-way valve with an operating stem 33 disposed in a valve housing 34 and carrying a roller 35 biased by a spring 36 to abut the surface 31 of the precess cam 30. The master control valve has associated therewith a pressurized fluid supply line 37 through which it receives pressurized fluid from a pressurized fluid source and pressurized fluid distribution lines 38 and 39 of which line 38 is connected to cylinders 20 and 22 and line 39 is connected to cylinders 21 and 23. The master control valve 32 also has a fluid discharge line 40 which may lead to a fluid collection area or to lubrication points receiving the low pressure fluid discharged from the cylinders 20 to 23. Preferably, all cylinders or pistons are provided with small vents so arranged as to bleed off any gases. As shown in FIG. 1, the control valve 32 may be slidably supported on a threaded support post 41 mounted on the housing 10 such that its position is adjustable by a ratio control knob 42 threaded onto the post 41. A relatively strong spring 43 surrounds the post 41 and forces the valve housing into engagement with the control knob 42 so as to permit position control of the valve housing 34 by adjustment of the control knob 42.

OPERATION

When the transmission ratio of the transmission is to be changed, the valve housing 34 is moved for example, axially against the force of the spring 43. The movement will provide for communication between the fluid supply line 37 and fluid distribution line 39 such that pressurized fluid is supplied to cylinders 21 and 23. At the same time the distribution line 38 is placed into communication with the discharge line 40 permitting discharge of fluid from the cylinders 20 and 22 thereby providing for axial precess movement of the roller support structures 16 and 17 in opposite directions. The roller support structure 16 is moved away from the control valve 32 and the control valve stem 33 follows the precess cam 30 moving with the roller support structure 16 until distribution line 39 is closed. The precess movement of the roller support structures 16 and 17 causes the traction rollers 12 to walk to different circles of engagement with the respective toroidal discs 14 thereby changing the transmission ratio and pivoting the roller support structures 16 and 17. Rotation of the transmission in the proper predetermined direction will cause pivoting of the roller support structure 16 in a direction such that the control valve roller 35 descends on the cam surface 31 or, rather, as pivoting to a different transmission ratio takes place, the traction roller support structure 16 is permitted to return to its normal neutral position, however at a different transmission ratio that is at a different contact position of the cam surface 31 with the control valve roller 35.

Within the control range of the transmission there is for each position of the control valve 32 a corresponding pivot position of the roller support structures 16 and 17, that is a corresponding transmission ratio which can simply be set by adjusting the control valve position.

In the example given in FIG. 1 the position of the control valve 32 is adjustable by an adjusting knob 42. However other means such as a lever operating mechanism may be used. Also hydraulic or, especially in connection with an automotive transmission, vacuum operated mechanisms may be used for controlling the position of the master control valve 32.

Figure 2:
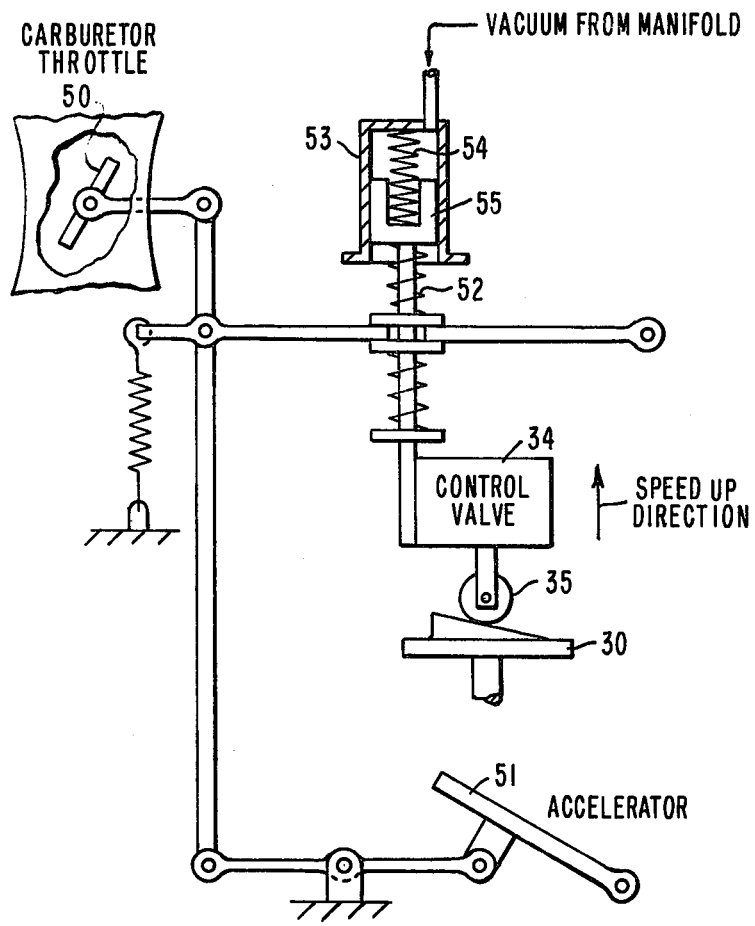
FIG. 2 shows a control arrangement for a particular application of the present invention.

An example for an automatic transmission control arrangement is given schematically in FIG. 2. Here, engine intake manifold vacuum in combination with accelerator pedal position is used to control the transmission ratio. Full opening of the carburetor throttle by stepping down on the accelerator pedal 51 will bias the control valve 34 over modulating spring 52 into a speed-up direction. At the same time, however, the vacuum in cylinder 53 will collapse such that the piston spring 54 will first move the piston 55 against the modulating spring downwardly (as shown in FIG. 2) to change the transmission ratio for greater acceleration. As the engine speed is increasing the vacuum in the engine intake manifold is building up and counteracts the force of piston spring 54 thereby moving the ratio control valve into speed-up direction. As the desired speed is being reached, the accelerator is slowly released providing for even greater intake manifold vacuum and change of the transmission ratio in speed-up direction until a desired balance is reached.

The control arrangement as shown is mechanial to facilitate understanding of its operation. Modern technology however will easily substitute electronic components for the mechanical means described hereabove.

In any case, a transmission ratio change with the traction roller transmission control described herein is achieved simply by moving a master control valve structure provided with mechanical feedback means for determining execution of a desired transmission ratio change and insuring that the desired transmission ratio is maintained. There are no forces transmitted to the operating mechanism which therefore may be light and inexpensive. All forces are taken up by hydraulic fluid which greatly reduces wear so that the control mechanism is also reliable and has a long operating life.

I claim:

1. A transmission ratio control arrangement for an infinitely variable traction roller transmission comprising: a housing; coaxial input and output shafts rotatably supported in said housing; toroidal discs mounted opposite each other on said input and output shafts such that a toric cavity is formed therebetween; motion transmitting traction rollers disposed in said toric cavity in radial symmetry with respect to the axis of said input and output shafts; means for forcing said toric discs and said traction roller into firm engagement with each other for transmitting motion therebetween; a pivotal support structure for each of said traction rollers, each said support structure being movable in a direction of its pivot axis; at least one hydraulic operating structure disposed adjacent each traction roller support structure and operatively associated therewith for transmitting precess motion thereto; at least one of said traction roller support structures having a cam disc mounted thereon for axial and pivotal movement therewith; a master control valve arranged adjacent the cam surface of said cam disc, said control valve having a control member and a cam follower in contact with said cam surface, said cam follower having a predetermined position with respect to said cam surface for each transmission ratio of said transmission, said master control valve being connected to a pressurized fluid source and to each of said hydraulic operating structures for supplying pressurized fluid to said hydraulic operating structures or, respectively releasing hydraulic fluid therefrom when said cam follower is not in its respective predetermined position.

2. A control arrangement as claimed in claim 1, wherein said hydraulic operating structure is a cylinder formed in said housing and a piston disposed in said cylinder adjacent to, and in abutment with, said traction roller support structure.

3. A control arrangement as claimed in claim 1, wherein a hydraulic operating structure is disposed at each end of each pivotal traction roller support structure.

4. A control arrangement as claimed in claim 3, wherein said cam disc is mounted on the free end of a stem connected to one of said roller support structure and extending through aligned axial openings in the adjacent piston and cylinder.

5. A control arrangement as claimed in claim 3, wherein said cam surface is disposed on the face of said cam disc, said cam follower being movable in precess movement direction of said traction roller support structure.

6. A control arrangement as claimed in claim 1, wherein said pressurized fluid for operating said hydraulic operating structure is a liquid and wherein either of said pistons and cylinders is provided with a vent for bleeding gases from said cylinders.

7. A control arrangement as claimed in claim 1, especially for use in combustion engine operated automobiles, wherein said control valve is biased in a speed-reduction direction, means are associated with the automobiles' accelerator pedal for biasing said control valve in speed-up direction and means are provided depending on the load level of said engine for biasing said valve in a speed-up direction thereby enhancing reduced engine speed when the engine load is light.

* * * * *